United States Patent [19]
Newman

[11] 3,963,621
[45] June 15, 1976

[54] MEMBRANE DIFFUSION DEVICE HAVING RIBBED MEMBRANE SUPPORT

[75] Inventor: Ferris E. Newman, Libertyville, Ill.

[73] Assignee: Baxter Laboratories, Inc., Deerfield, Ill.

[22] Filed: Oct. 21, 1974

[21] Appl. No.: 516,527

[52] U.S. Cl. .......................... 210/321 B; 210/494 M
[51] Int. Cl.² .......................................... B01D 31/00
[58] Field of Search ............................ 210/321, 494

[56] References Cited
UNITED STATES PATENTS

| | | | |
|---|---|---|---|
| 3,687,293 | 8/1972 | Carter | 210/321 |
| 3,743,098 | 7/1973 | Martinez | 210/494 X |

*Primary Examiner*—Frank A. Spear, Jr.
*Attorney, Agent, or Firm*—Louis Altman; Garrettson Ellis

[57] ABSTRACT

A membrane diffusion device is disclosed which comprises flat, tubular, semipermeable membrane, and flexible, ribbed membrane support sheet positioned against said membrane and typically rolled up together into a coil. In accordance with this invention, a first set of membrane supporting ribs is disposed on one side of the support sheet with the ribs of the first set being disposed in longitudinal relation to the axis of the tubular membrane, the ribs of the first set also defining spaced apertures to permit fluid flow transversely across the membrane. A second set of membrane supporting ribs is disposed on the other side of the membrane support sheet at an angle to the tubular membrane axis.

10 Claims, 5 Drawing Figures

MEMBRANE DIFFUSION DEVICE HAVING RIBBED MEMBRANE SUPPORT

BACKGROUND OF THE INVENTION

Coil type artificial kidneys in which non-woven screening is used as a membrane support are an important commercial therapeutic device, and are disclosed in U.S. Pat. Nos. 3,510,004 and 3,508,662. The use of such non-woven screening constituted an important advance in the art of dialysis, causing a significant reduction in price, and providing important functional advantages.

Attempts to produce even less expensive dialyzers have utilized embossed, ribbed sheeting as the membrane support for coil dialyzers, as is shown in U.S. Pat. No. 3,687,293. However, that structure has certain inherent functional disadvantages, in that it has been essentially unfeasible to obtain a very low flow resistance within the tubular membrane, and a correspondingly low pressure drop, coupled with a desirably low fluid volume within the tubular membrane.

In accordance with this invention, a ribbed sheeting membrane support is provided in which one of the sets of ribs is disposed in longitudinal relation to the axis of the tubular membrane, and both the flow resistance and the fluid volume of the tubular membrane can be improved, while permitting the use of the less expensive, ribbed support sheeting in place of the non-woven membrane support.

DESCRIPTION OF THE INVENTION

This invention relates to a membrane diffusion device comprising a flat, semipermeable membrane, which is typically tubular, and a flexible, ribbed membrane support sheet positioned against a tubular membrane. The tubular membrane and support sheet may be coiled together in conventional manner into a spiral with coils of membrane being positioned between coils of the support sheet, although flat diffusion devices may also be fabricated using the present invention.

In accordance with this invention, a first set of membrane-supporting ribs on one side of the support sheet are each disposed in longitudinal relation to the axis of the tubular membrane. The ribs of the first set also define a series of rib sections arranged in a plurality of lines, the rib sections of individual lines being spaced apart to define a plurality of spaced apertures, to permit transverse fluid flow across the membrane through said ribs. A second set of membrane-supporting ribs on the other side of the membrane support sheet defines an angle with the tubular membrane axis.

In coils, it is generally preferred for the spacing between the first set of membrane-supporting ribs to be greater than the spacing of the second set of ribs, which results in the desired reduction of flow resistance through the tubular membrane, while permitting the fluid volume of said tubular membranes to remain low. It is frequently desirable for the flow resistance of the tubular membranes to be low in order to restrict the amount of ultrafiltration (water removal) from blood which passes through the tubular membrane. Ultrafiltration is particularly dependent upon the pressure drop through the tubular membrane, and the rate of ultrafiltration can be reduced by reducing the pressure drop.

The fluid volume of the tubular membrane is desirably low, since it is clearly desirable to remove from the body as little blood as possible at any one time, to minimize stress on the patient, and to preserve as much blood as possible in the event that a major leak or other accident requires immediate shut-off of the artificial kidney and loss of the blood contained therein.

Typically, the spacing of the first set of ribs is from 0.12 to 0.14 inch (e.g. 0.125 inch), and the spacing of the second set of ribs may be about 0.06 to 0.1 inch (e.g. 0.08 inch). Excellent flow characteristics and low fluid volume in the tubular membrane may be achieved at these dimensions, particularly when the ribs are generally triangular in cross-section, having a base of about 0.02 to 0.03 inch and a height of about 0.02 to 0.03 inch. The first and second set of ribs desirably define about a 45° to 60° angle to each other.

The apertures or spaces between the linearly arrayed rib sections of the first set are typically so spaced as to define, in each rib of the first set, a large plurality of rib sections of equal length which are uniformly spaced from each other by the apertures. The rib sections of the same rib may typically be longitudinally spaced from each other by a distance which approximates the length of each said rib section. Accordingly, there may be provided abundant opportunity for dialysis solution to pass transversely through the coil and across the membrane tubing for diffusion exchange with the blood.

The membrane support sheet used therein may be free of holes communicating between the opposite sides thereof, unlike the non-woven screening previously used, which, in effect, defines holes between opposite sides of the screening adjacent every junction point of the crossing strands.

In the drawings, FIG. 1 is a perspective view of a partially coiled membrane diffusion device made in accordance with this invention.

Figures 1, 2:
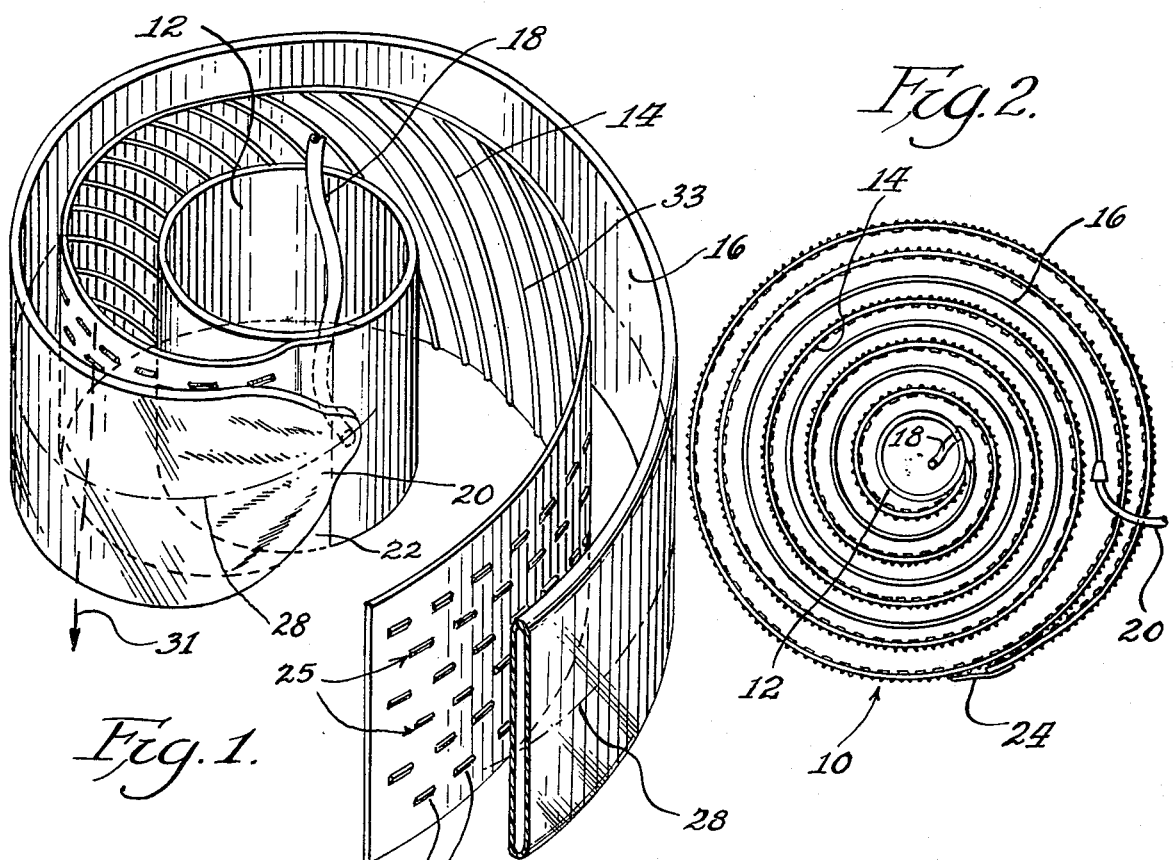
FIG. 2 is a plan view of the membrane diffusion device of FIG. 1 after coiling.
Figure 3:
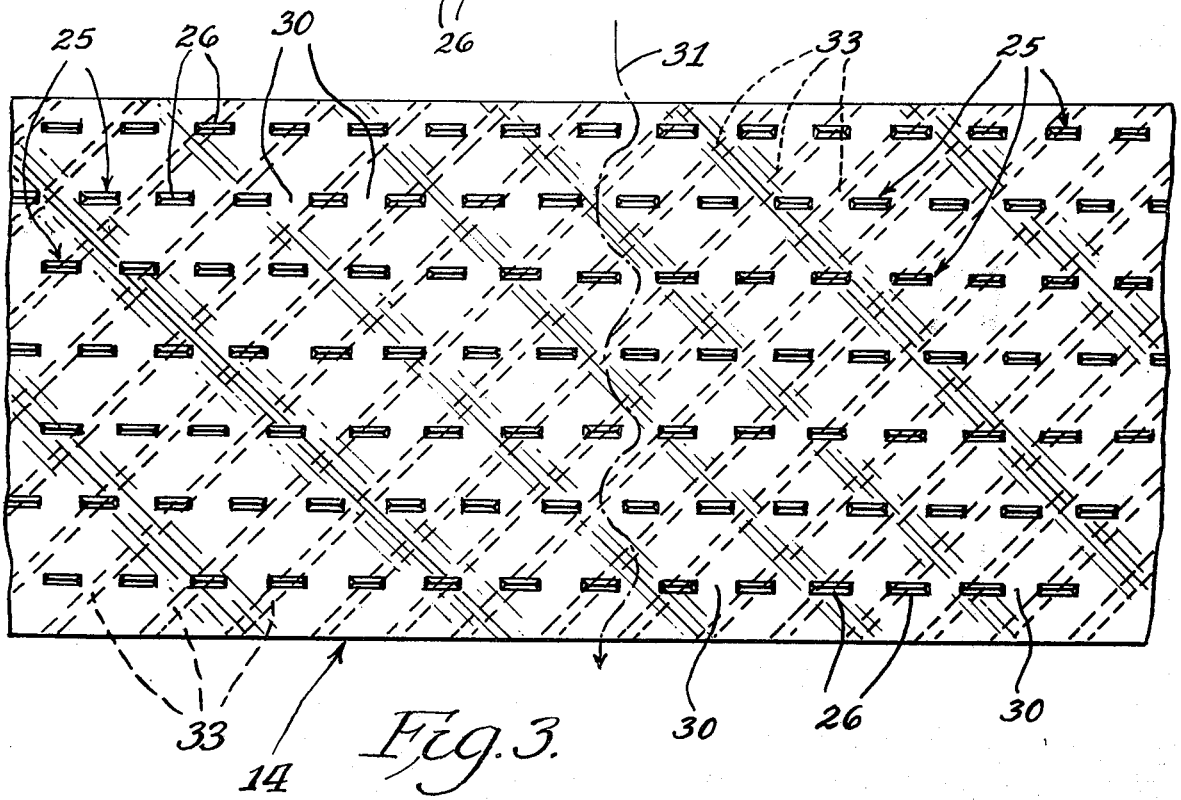
FIG. 3 is a plan view of a section of the membrane support sheet utilized in the device of FIG. 1.

Referring to the drawings, a membrane diffusion device 10 is disclosed which comprises a core 12 about which is coiled a flexible, ribbed, membrane support sheet 14, which is positioned against tubular membrane 16 and coiled together with it in the manner illustrated. Accordingly, the coils of membrane 16 are enclosed between coils of support sheet 14, for retention and for the formation of flow channels both inside and outside of membrane 16.

Tube 18 communicates conventionally with one end 20 of membrane 16 through the wall of core 12, to provide fluid communication therewith. The other end of membrane 16 is similarly connected to a fluid flow tube 20 in the manner of conventional dialyzers.

Membrane support 14 is also attached to core 12 at its end 22. Its other end 24 may then be secured by taping or the like to the next inner coil of membrane support 14, to prevent the coil from unrolling. Tubular membrane 16 is completely enclosed within coils of membrane support 14.

In accordance with this invention, membrane support 14 defines on one side thereof a first set of membrane supporting ribs 25, which are disposed in longitudinal relation to the axis 28 of tubular membrane 16. These ribs of the first set define a plurality of rib sections 26 spaced by apertures 30, which permits the flow of fluid transversely across the membrane through ribs 25: for example, in the direction indicated by path of flow 31. Dialysis solution for example, may follow path of flow 31 when the device of this invention is used as a dialyzer having a blood flow path inside of the tubular membrane 16, and a dialysis solution flow path passing transversely across tubular membrane 16 on the outside thereof.

As stated above, each rib 25 defines a large plurality of apertures 30, perhaps a hundred or more, in a coil diffusion device utilizing a strip of membrane support which may typically be about ten feet long.

Typically, the length of each rib section 26 may be about 0.06 to 0.07 inch, for example, 0.062 inch. Apertures 30 may space neighboring rib sections 26 by a distance which approximates the length of rib section 30.

The individual longitudinal ribs 25 may be transversely spaced from each other by, for example 0.12 inch.

It should be noted that, in the drawings, the ribs are magnified out of the typical scale for clarity of disclosure.

Figure 4:
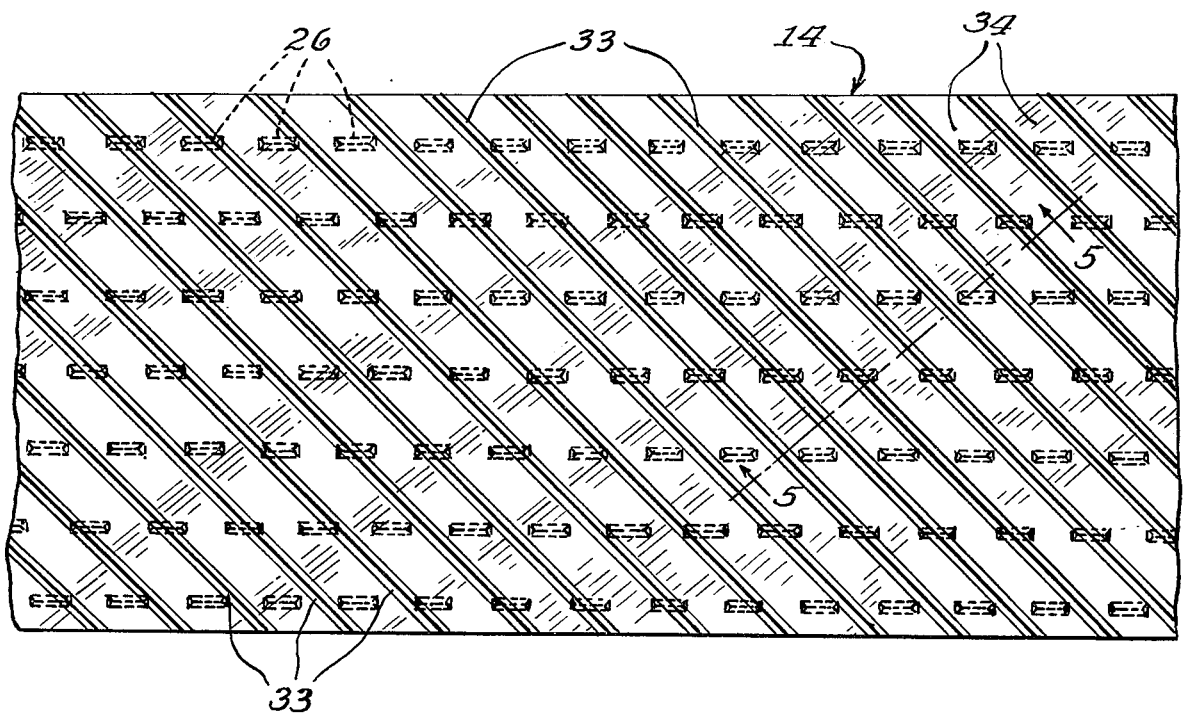
FIG. 4 is a plan view of the other side of the membrane support sheet as shown in FIG. 3.

The other side of membrane support 14 defines a second set of ribs 33, which define an angle with tubular membrane axis 28. As can be seen from FIG. 4, straight, transverse, angularly-oriented flow channels 34 for dialysis fluid or the like are defined between ribs 33, so that transverse flow of dialysis fluid can take place across the sides of membrane 16 which face ribs 33.

Ribs 33 may be typically spaced from each other by about 0.08 to 0.09 inch, e.g., 0.082 inch.

Figure 5:
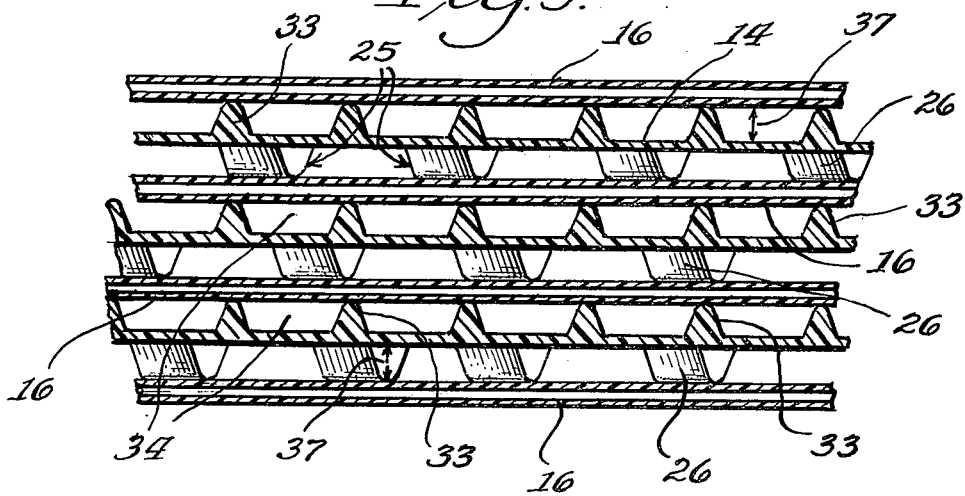
FIG. 5 is a sectional view taken along Line 5—5 of FIG. 4, after the membrane support sheet of FIG. 4 has been incorporated into a coil diffusion device.

The cross sections of both ribs 33 and rib sections 26 may be, as shown in FIG. 5, roughly triangular in shape, each rib and rib section having an elevation 37 of, for example, 0.023 inch. Membrane support sheet 14 itself may be about 0.004 inch thick.

Oppositely facing ribs 33 and rib sections 26 of neighboring coils can abut each other in crossing relationship, with a coil of membrane 16 between them, to space the coils of membrane support 14, and to define the flow channels 31, 34 along opposite sides of the membrane coils, to facilitate the flow of dialysis solution or the like exterior of the membrane.

The rib sections 26 of adjacent ribs 33 may be longitudinally displaced relative to each other to lengthen the flow path of dialysis solution or the like, passing transversely across membrane support 14, and to assure that a large number of rib sections 26 abut oppositely facing ribs 33 on an adjacent coil of membrane support, for spacing purposes.

Membrane support 14 may be made by embossing polyethylene sheeting or the like. Tubular membrane 16 is made of cellophane or a derivative thereof when the device of this invention is to be used as a blood dialyzer. Alternatively, membrane 16 may be made of silicone rubber or the like if a blood oxygenator is desired.

The above has been offered for illustrative purposes only, and is not intended to restrict the scope of the invention of this application, which is as defined in the claims below.

That which is claimed is:

1. In a membrane diffusion device which comprises a flat, tubular, semi-permeable membrane and a flexible, ribbed, membrane support sheet positioned against said tubular membrane, said tubular membrane and support sheet being coiled together into a spiral with coils of membrane being positioned between coils of said support sheet, the improvement comprising:
a first set of membrane-supporting rib sections arrayed in a series of lines on one side of said support sheet, said linear array of rib sections of the first set being disposed in longitudinal relation to the axis of said tubular membrane, said rib sections of the first set being spaced from each other to define a plurality of spaces between the rib sections to permit fluid flow transversely across said membrane between said rib sections in linear array; and a second set of membrane-supporting ribs on the other side of said membrane support sheet, said ribs of the second set defining an angle with said tubular membrane axis.

2. The diffusion device of claim 1 in which the spacing between the linear arrays of the rib sections of the first set is greater than the spacing between the ribs of the second set, to facilitate fluid flow through said membrane tubing while retaining a low fluid volume therein.

3. The diffusion device of claim 2 in which a large plurality of rib sections of equal length, and spaced from each other, are defined by each line of rib sections.

4. The diffusion device of claim 3 in which said rib sections in linear relation to each other are spaced from each other by distance which approximates the length of each said rib section.

5. The diffusion device of claim 4 in which said membrane support sheet is free of holes communicating between the opposite sides thereof.

6. The diffusion device of claim 5 in which the rib sections of adjacent lines of rib sections are longitudinally displaced relative to each other.

7. In an elongated, ribbed, flexible, sheetlike membrane support strip for use in a membrane diffusion device, the improvement comprising:
a first set of membrane supporting rib sections arranged in a plurality of parallel lines on one side of said strip, the lines of rib sections of the first set being disposed in longitudinal relation to the axis of said strip, said rib sections being spaced from each other, and a second set of membrane-supporting ribs on the other side of said strip, said ribs of said second set defining an angle with the axis of said strip.

8. The elongated strip of claim 7 in which the spacing between the lines of rib sections is greater than the spacing between the ribs of the second set, and in which the rib sections in a line are so spaced as to define in each line a large plurality of rib sections of equal length.

9. The elongated strip of claim 8 in which said rib sections in a line are spaced from each other by a distance which approximates the length of each rib section.

10. The elongated strip of claim 9 in which the rib sections of adjacent lines of the first set are longitudinally spaced relative to each other.

* * * * *